United States Patent [19]

Hinderhofer

[11] Patent Number: 5,620,189

[45] Date of Patent: Apr. 15, 1997

[54] SCOOTER

[76] Inventor: Jürgen Hinderhofer, Engelgasse 6, 88400 Biberach, Germany

[21] Appl. No.: 382,092

[22] Filed: Jan. 30, 1995

Related U.S. Application Data

[63] Continuation-in-part of Ser. No. 273,837, Jul. 12, 1994, abandoned.

[30] Foreign Application Priority Data

Aug. 12, 1993 [DE] Germany ............................ 9312041 U

[51] Int. Cl.⁶ ........................................................ B62M 1/00
[52] U.S. Cl. .................................. 280/5.24; 280/87.041; 188/5
[58] Field of Search ........................... 280/87.041, 87.05, 280/87.01, 87.021, 92, 200, 263, 270, 293, 301, 239, 11.22, 5.2, 5.24; 188/5, 6, 24.12, 2 D

[56] References Cited

U.S. PATENT DOCUMENTS

| | | | |
|---|---|---|---|
| 1,124,897 | 1/1915 | Hasskarl | 280/87.041 |
| 1,350,929 | 8/1920 | McCarthy | 280/87.041 |
| 1,514,720 | 11/1924 | Pauly | 280/87.041 |
| 1,844,305 | 2/1932 | White | 280/87.041 |
| 2,319,066 | 5/1943 | Klatt et al. | 280/87.041 |
| 3,158,220 | 11/1964 | Griffith | 280/239 |
| 3,888,511 | 6/1975 | Parrilla | 280/239 |
| 4,168,076 | 9/1979 | Johnson | 188/5 |
| 4,394,029 | 7/1983 | Holmgren | 280/87.041 |
| 4,688,816 | 8/1987 | Yang | 280/239 |
| 4,941,670 | 7/1990 | Parr | 188/5 |
| 4,951,958 | 8/1990 | Chao | 280/87.041 |
| 4,958,842 | 9/1990 | Chang | 280/87.041 |
| 5,039,121 | 8/1991 | Holter | 280/220 |
| 5,195,781 | 3/1993 | Osawa | 280/87.042 |
| 5,310,202 | 5/1994 | Goodspeed | 280/87.042 |
| 5,419,570 | 5/1995 | Bollotte | 280/87.041 |

FOREIGN PATENT DOCUMENTS

| | | | |
|---|---|---|---|
| 0549313 | 2/1923 | France | 280/87.05 |
| 1125737 | 11/1956 | France | 280/5.24 |
| 3277 | 2/1909 | United Kingdom . | |

OTHER PUBLICATIONS

Patentblatt 113, p. 14762 (Dec. 9, 1993).

Primary Examiner—Anne Marie Boehler
Attorney, Agent, or Firm—Nixon & Vanderhye PC

[57] ABSTRACT

The scooter of this invention is provided with a relatively large radius front wheel and a relatively small radius rear wheel attached to a compact frame assembly. Advantageously, the front wheel is a conventional bicycle-type wheel assembly comprised of a spoked wheel and a pneumatic tire, and has a radius which is at least four, and more preferably eight, times greater than the radius of the rear wheel. The frame assembly includes a planar footboard as a rear component and a front component which is connected to a forward end of the footboard and is curved upwardly therefrom so as to subtend a circumferential segment of the large-radius front wheel. A steerable yoke assembly is journalled to the forward end of the curved frame component to allow the large-radius front wheel to be steered by the operator (e.g., via a conventional handle bar assembly). The scooter may include a skid stop and/or a conventional hand-actuated caliper-type brake assembly. Furthermore, a variety of equipment and accessories typically used for conventional bicycles, for example, caliper brakes, running lights, fender, bell, parcel basket, and the like, may likewise be employed in the scooter of this invention.

47 Claims, 3 Drawing Sheets

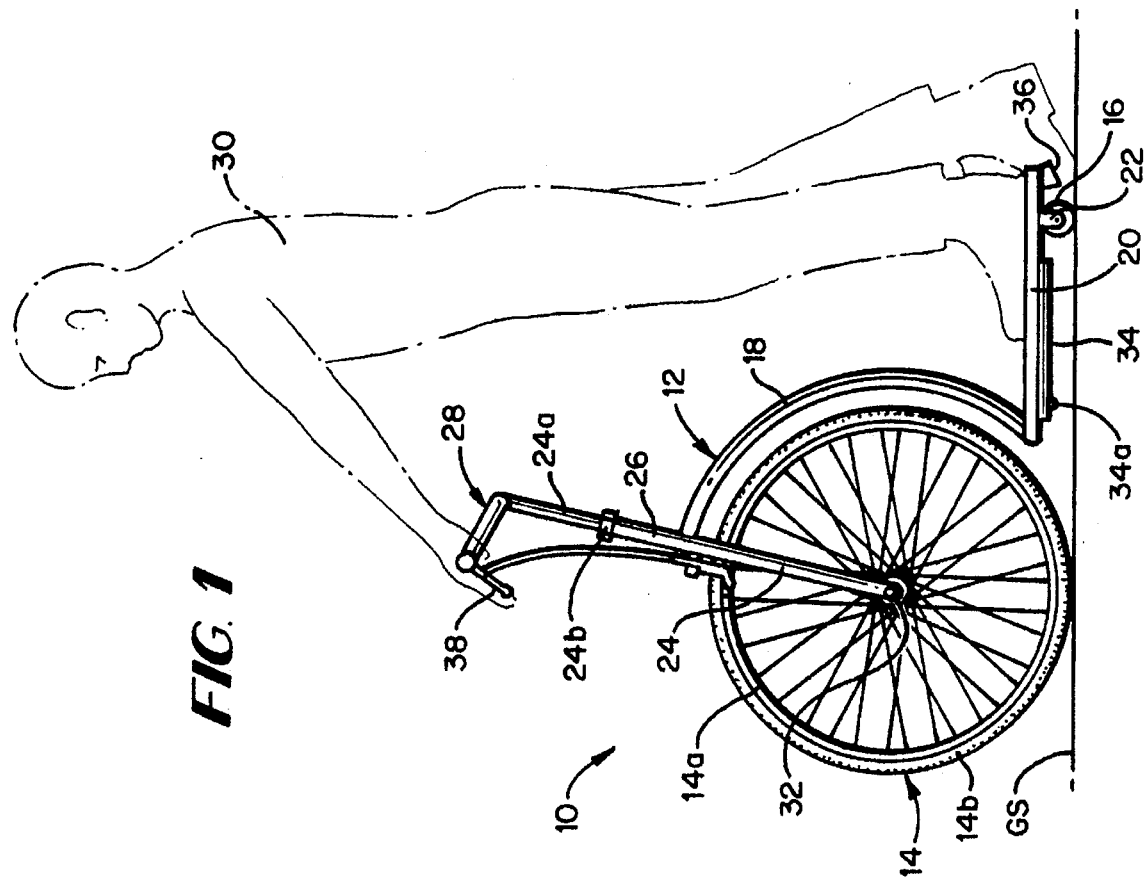

SCOOTER

CROSS-REFERENCE TO RELATED APPLICATION

This application is a continuation-in-part of U.S. application Ser. No. 08/273,837 filed on Jun. 12, 1994 (now abandoned) in the name of the same inventor as the present application, the entire content of such application being incorporated hereinto expressly by reference.

FIELD OF INVENTION

The present invention relates to wheeled vehicles generally known as "scooters" having a steerable front wheel, an unsteerable rear wheel and a frame which includes a foot board connecting the front and rear wheels.

BACKGROUND AND SUMMARY OF THE INVENTION

Scooters are well known vehicles used as a means of personal transportation in a variety of situations. One conventional leisure scooter which is sized to accommodate adults and children is disclosed in German Utility Model 91 12 537 (hereinafter the German UM '537) as having oversized wheels for purposes of providing good rolling features so that it may be environmentally friendly for purposes of exercise and/or leisure, as well as providing a means of locomotion, e.g., for shopping, intra-company transportation, and the like.

One problem associated with the conventional leisure scooter disclosed in the German UM '537 is its relatively high weight and awkwardness due to its larger frame with two relatively large wheels. As a result, the leisure scooter is difficult to accommodate in the trunk of a passenger car, typically requiring the trunk of the car to remain at least partially open when being transported therein. Furthermore, because of its size and weight, the leisure scooter cannot be brought aboard public transportation vehicles, such as buses, trains, subway cars, and the like. As a result, the leisure scooter disclosed in the German UM '537 cannot be easily transported over long distances by the user and thus is not available for the user's local transportation needs.

It would therefore be especially desirable if a scooter were provided is as compact and lightweight as possible and thus could be used as personal transportation in metropolitan areas since it could then be taken onto public transportation vehicles. It would furthermore be desirable if such a scooter exhibited good rolling capabilities so that it could be safely and efficiently operated by both children and adults thereby making its manufacture more simple and economical. It is towards providing such an improved scooter that the present invention is directed.

Broadly, the present invention is embodied in a scooter having front and rear wheels of significantly different size. More particularly, according to the scooter of this invention, a relatively large-radius wheel is employed as the steerable front wheel, while a relatively small-radius wheel is employed as the unsteerable rear wheel. Advantageously, the radius of the front wheel is at least four and more preferably at least about eight, times greater than the radius of the rear wheel.

Several advantages ensue from the relatively larger front wheel and smaller rear wheel in the scooter according to this invention. For example, the overall length and weight of the scooter can be decreased significantly as compared to prior art scooters. Thus, a compact personal transportation vehicle is provided that can be used for many different purposes since it can be operated easily and safely and can itself be transported without problems in private and public transportation vehicles and in building elevators.

Because of the larger size of the front wheel, its axle is spaced physically above the substantially horizontal plane of the footboard on which the user stands during the scooter's operation. The axle of the smaller rear wheel, on the other hand, is disposed near the footboard plane, and most preferably is disposed physically below the footboard plane. It is possible, however, that the axle of the smaller rear wheel can be disposed in the plane of as well as above the footboard plane, if desired. As a result, both adult and child users can step on and off the footboard both laterally and from the rear with ease since the footboard is located fairly close to ground surface and since the rear wheel does not impede such movements.

It has surprisingly been discovered that the scooter according to this invention rolls extraordinarily easily and can be steered virtually effortlessly. It is presumed that the relatively large-radius front wheel and relatively small-radius rear wheel, with their respective varying axle planes, are responsible for such functions. In addition to the functional benefits mentioned above, the relatively large-radius front wheel rolls easily over ground irregularities without getting stuck. The small-radius rear wheel is responsible for decreasing the length of the scooter so that it can be made as compact as practical. That is, the footboard does not need to be any larger than what is needed for the user's feet to be placed side-by-side to one another during operation. The low plane of the footboard also creates a relatively low center of gravity for the scooter with the user standing on it thereby promoting increased stability. The increased stability, in turn, permits the scooter of this invention to be operated by people with unsteady balance (e.g., elderly persons, children and the like).

The frame of the scooter according to this invention includes the planar footboard as a rear component and a front component which is connected to a forward end of the footboard and is curved upwardly therefrom so as to subtend a circumferential segment of the large-radius front wheel. A steerable yoke assembly is journalled to the forward end of the curved frame component to allow the large-radius front wheel to be steered by the operator (e.g., via a conventional handle bar assembly).

The small-radius rear wheel can be formed of one or more rollers. When a pair of such rollers are employed laterally to one another, the stability of the scooter can be further increased (e.g., due to its "three-point" contact with the ground surface). The rolling efficiency of such a multi-rear wheel scooter can also be increased to an extent that relatively broad, low riser steps can be traversed (e.g., escalator steps).

The scooter of this invention can be equipped with a parking stand located under the footboard that is pivotal into an operative position by the operator when desired to allow the scooter to stand upright during inactive periods. The rear end of the footboard may also be provided with a depending skid brake by which the operator may cause to come into contact with the ground surface by tilting the scooter rearwardly. Contact between the ground surface and the skid brake thus serves to slow the forward speed of the scooter to assist in its stopping and/or steering.

The scooter of this invention can also be provided with a variety of equipment and accessories typically used for conventional bicycles, for example, caliper brakes, running lights, fender, bell, parcel basket, and the like.

Further aspects and advantages of this invention will become more clear after careful consideration is given to the following detailed description of the preferred exemplary embodiment thereof.

BRIEF DESCRIPTION OF THE DRAWINGS

Reference will hereinafter be made to the accompanying drawings wherein like reference numerals throughout the various FIGURES denote like structural elements, and wherein;

FIG. 1 is a side elevational view showing a preferred embodiment of the scooter according to this invention in use;

FIG. 2 is a front elevational view showing the scooter depicted in FIG. 1 resting upright on its kick-stand during an inactive period;

DETAILED DESCRIPTION OF THE PREFERRED EXEMPLARY EMBODIMENTS

Figure 3:
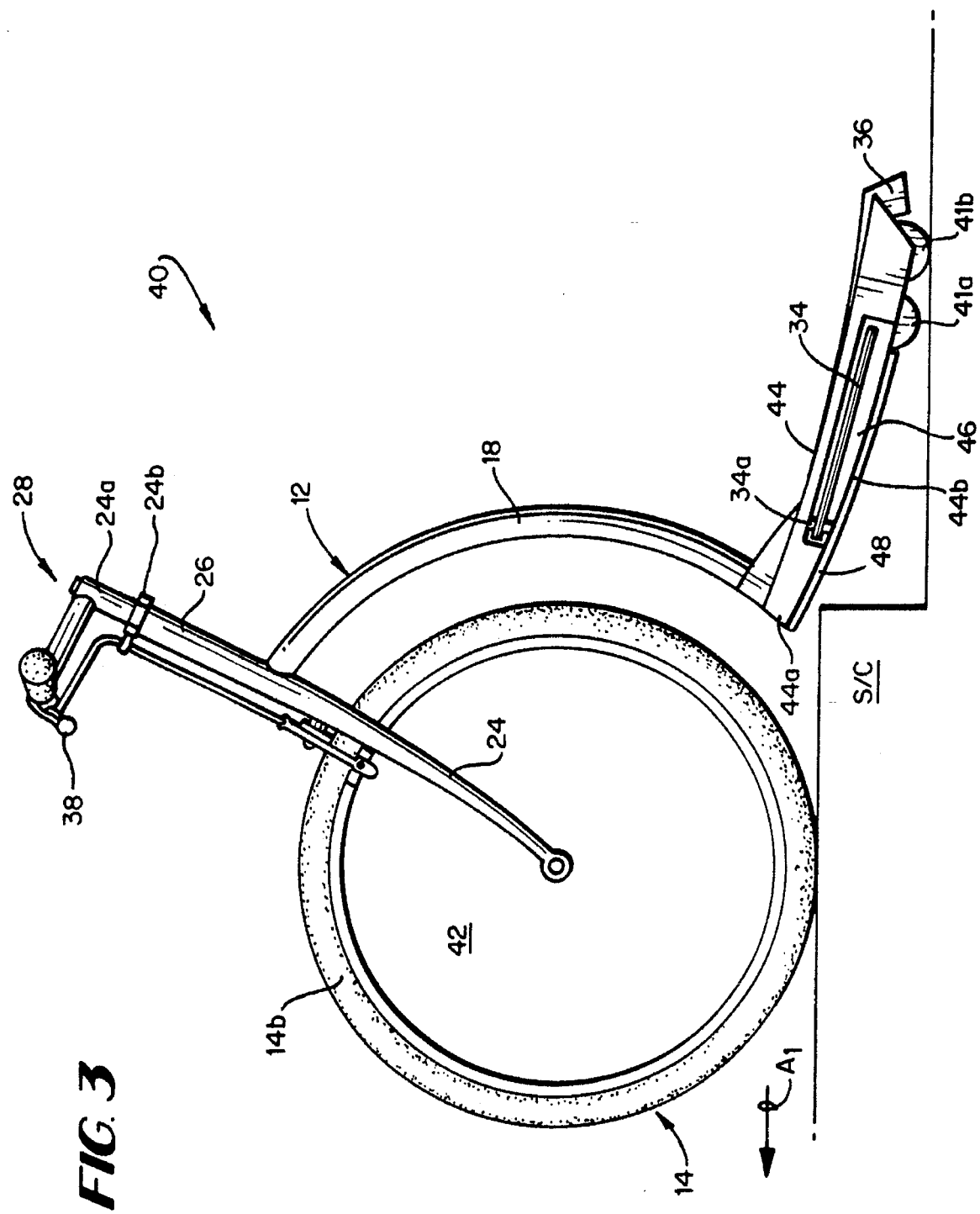
FIG. 3 is a side elevational view of another preferred embodiment of the scooter according to this invention.

As is seen in FIGS. 1 and 2, the scooter 10 according to this invention is generally comprised of a frame 12 to which front and rear wheels 14, 16 are journaled for rolling movement over the ground surface GS. The frame 12 is itself comprised of a forward curved component 18 and a rearwardly extending horizontal footboard 20 to which the rear wheel 16 is attached by an unsteerable bracket 22.

The front wheel 14, on the other hand is journaled to a fork member 24 having an upper extension rod 24a which is received within tubular section 26 attached rigidly (e.g., via welding) to the forward frame component 18. The fork member 24 is thus pivotal about an upright steering axis established by the tubular section 26. In this regard, the tubular section 26 is connected to the forwardmost end of the curved frame component 18 so that it is substantially at right angle thereto and thus establishes the upright (substantially vertical) steering axis for the front wheel 14.

The upper end of extension rod 24a is connected to a conventional bicycle-type handle bar assembly 28. As a result, the front wheel 14 may be turned about the steering axis established by the tubular section 26 to allow the scooter 10 to be steered manually by the operator 30. The extension rod 24a of the fork 24 may be provided with a friction lock assembly 24b which telescopically receives a section of the handle bar assembly 28 in a conventional manner to allow for height adjustment to suit the operator 30.

As is particularly seen in FIG. 1, the frame 12 is generally L-shaped with the forward curved frame component 18 forming an upright section of the frame 12 and the footboard 20 forming a horizontal section of the frame 12. The forward curved component 18 of the frame 12 is radially concentric with the axle 32 of front wheel 14 and is arcuately shaped so as to conform to the circumference of the front wheel 14. As a result, the curved forward frame component 18 between its acute angular juncture with the forward end of the footboard 20 and the tubular section 26 subtends an angular segment of the front wheel 14. Typically, the angular segment which is subtended by the forward curved component 18 of frame 12 is between about 90° to about 120° (i.e., between about one-fourth to about one-third of the front wheel's circumference).

The front wheel 14 is substantially larger in radius as compared to the radius of the rear wheel 16. Preferably, the front wheel 14 is a conventional bicycle-type wheel assembly having a spoked wheel 14a and a pneumatic tire 14b. The front wheel 14 thus may have a radius of between about 4 to about 14 inches. In any event, the radius of the front wheel 14 is at least about four, and more preferably at least about eight, times the radius of the rear wheel 16.

It will be observed that a horizontal plane passing through the axle 32 of the front wheel 14 is spaced above the horizontal plane of the footboard 20 of the frame 12. The central rolling axis of the rear wheel 16, on the other hand, is most preferably disposed below the horizontal plane of footboard 20. However, the rear wheel 16 could be sized and/or configured such that its rolling axis coincides with, or is disposed above, the plane of the footboard 20. In any event, the rolling axis of the rear wheel 16 will not be disposed in the same plane as the axle 32 of the front wheel 14. Instead, according to the present invention, a horizontal plane containing the axle 32 will be spaced vertically above a horizontal plane containing the rolling axis of the rear wheel 16.

A single, unsteerable rear wheel 16 may be employed in the scooter 10 of this invention as shown in the accompanying FIGURES. However, as desired, a plurality of rear wheels 16 may be employed in either a side-by-side manner (as shown in phantom line by reference numerals 16' in FIG. 2) or an in-line manner (as shown by reference numerals 41a, 41b in FIGS. 3 and 4). Similarly, the rear wheel 16 may be in the form of a cylindrical roller having an axle dimension substantially corresponding to the transverse dimension of the footboard. Such rear wheel arrangement is advantageous in terms of increased rolling stability for the scooter 10.

The scooter 10 according to this invention may be provided with a conventional kick-stand 34 which is pivotally coupled to the footboard 20 to allow the stand 34 to be pivoted between a stowed position below the footboard 20 (as shown in FIG. 1) to an operative position where it extends laterally from the footboard 20 (as shown in FIG. 2). As a result, the stand 34 may be deployed during periods of inactivity so as to allow the scooter 10 to remain essentially upright.

The scooter 10 may also be provided with a skid stop 36 which is immovably attached to the bottom of the footboard 20. Preferably, the skid stop 36 is angled so that its lowermost surface is disposed substantially parallel to the ground surface GS when the operator 30 tilts the scooter rearwardly—i.e., lifts the front wheel 14 from the ground surface GS and pivots the frame 12 about the rolling axis of the rear wheel 16. This tilting movement of the scooter 10 (which may be caused, for example, by the operator shifting his or her weight rearwardly of the rear wheel 16) thus causes the skid stop to come into contact with the ground surface GS to slow the scooter's forward speed and thus assist the operator 30 in controlling the stopping and/or steering of the scooter 10.

The scooter 10 according to this invention may be equipped with devices and/or accessories common to conventional bicycles. For example, as shown in the accompanying drawings, a conventional caliper-type, cable-actuated, hand-braking assembly 38 may be provided which exerts braking action on the rim of spoked wheel 14a. Although not shown in the drawings, the scooter 10 could likewise be provided with other typical bicycle-type accessories, including a fender for the front wheel, running light(s), bell, parcel basket, auxiliary engine, and the like. The possibility also exists that a wind screen (sun shield) may be attached to the handle bar assembly 28.

Accompanying FIG. 3 shows in side elevational view another preferred embodiment of a scooter 40 according to the present invention. In this regard, the scooter 40 is shown in FIG. 3 in the process of negotiating a step or curb S/C. The scooter 40 shown in FIG. 3 is substantively similar to the structures discussed above in relation to the scooter 10 shown in FIGS. 1 and 2. The scooter 40 is, however, provided with spoke covers (only one such cover 42 being visible in FIG. 3) so as to reduce the aerodynamic drag associate with the spokes of bicycle wheel 14, and that a pair of longitudinally in-line unsteerable rear wheels 41a, 41b are journalled to the footboard 44.

Another principal difference is that the footboard 44 in the scooter 40 shown in FIG. 3, includes a sidewall having a re-entrant (laterally recessed) portion 46 extending in the footboard's longitudinal direction. The re-entrant portion 46 thereby serves to house the kick-stand 34 when in its stowed position as shown. When stowed within the re-entrant portion 46, therefore, the kick stand is less exposed (i.e., since it is located physically within the lateral bounds of the footboard 44) and thereby minimizes the possibility that it will interfere with obstacles that may be encountered during rolling movement of the scooter 40 across the ground's surface.

Unimpeded traversal of obstacles, such a the step or curb S/C shown in FIG. 3, by the scooter 40 is further permitted by virtue of a runner element 48. The runner element 48 is most preferably centered on the longitudinal center line of the footboard 44 and is convexly curved from a forward edge region 44a rearwardly toward the rear rollers 41a, 41b. Though a single runner element integral with the footboard 44 is depicted in FIG. 3, multiple runner elements 48 may be provided, in which case such multiple runner elements 48 are preferably positioned symmetrically relative to the longitudinal center line of the footboard 44.

The runner element 48 also is dimensioned so as to extend downwardly from the footboard's bottom surface 44b to prevent the footboard's bottom surface 44b and the kick stand 34 housed within the footboard 44 from coming into contact with the ground surface during rolling movement of the scooter 40 thereacross. Thus, the runner element 48 extends downwardly from the bottom surface 44b of the footboard 44 to a location which is vertically disposed below the kickstand 34 when the latter is in its stowed position as shown in FIG. 3.

The runner 48 also serves the beneficial function of providing a longitudinal bearing surface for the footboard 44 when the scooter 40 traverses a raised obstacle, such as the step or curb S/C. That is, as the scooter approaches the step or curb S/C, the front wheel 14 will easily over the step or curb S/C due to the relatively large diameter of the wheel 14. As the scooter continues to be advanced in the direction of arrow $A_1$, the runner element 48 will then be brought into contact with the step or curb S/C. Since the runner element 48 is relatively narrow as compared to the width of the footboard 44, its engagement with the step or curb S/C will establish a relatively low friction bearing contact to allow the footboard 44 to be moved over the step or curb S/C. Once the rear rollers 41a, 41b have been placed on the upper elevation of the step or curb S/C, the continued rolling movement of the scooter 40 may resume.

Figure 4:
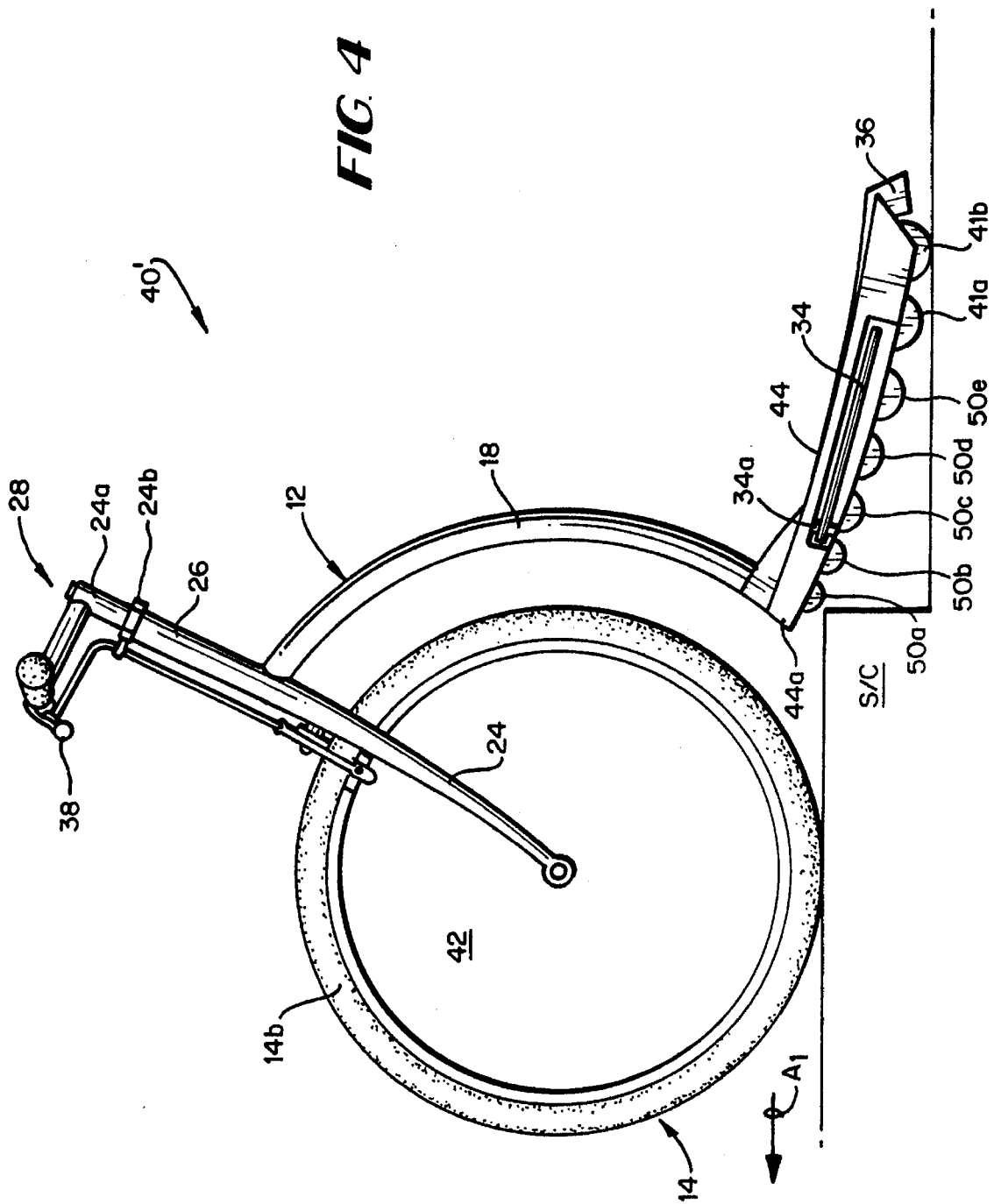
FIG. 4 is a side elevational view of yet another preferred embodiment of the scooter according to this invention.

As an alternative to the runner element 48, the scooter 40' may be provided with a series of in-line guide rollers 50a–50e mounted forwardly of the pair of rear rollers 41a, 41b as shown in FIG. 4. In this regard, the in-line guide rollers 50a–50e each provide a journalled bearing surface which contacts the step or curb S/C as the scooter 40 is advanced in the direction of arrow $A_1$.

Preferably, the guide rollers 50a–50e increase in diameter from the front edge portion 44a of the footboard 44 toward the rear rollers 41a, 41b. Thus, guide roller 50a located nearest to the front edge portion 44a of the footboard 44 preferably has the smallest diameter, with guide rollers 50b–50e having sequentially greater diameters as compared to the diameter of guide roller 50a. The largest diameter guide roller 50e will, however, have a diameter which is not as large as the diameter of the rear rollers 41a, 41b. In this manner, the increasing diameters of the guide rollers 50a–50e provide a relatively smooth bearing transition to the rear rollers 41a, 41b as the scooter 40' is advanced over the step or curb S/C. Furthermore, the diameters of the guide rollers 50a–50e as such that, when the scooter 40' is being rolled across substantially level terrain (e.g., as when it reaches the upper elevation of the step or curb S/C), the guide rollers 50a–50e will not be in contact with the terrain. That is, rolling movement of the scooter 40' across substantially level terrain is accomplished by virtue of terrain contact between the front wheel 14 and the rear rollers 41a, 41b.

As should now be understood, the scooter according to this invention represents an improvement over conventional scooters in that it is quite compact in both size and weight and thus can be employed as personal transportation in a variety of situations. Because of its relatively compact size and light weight, the scooter according to this invention can itself be transported in public and private vehicles where it could then be used by an operator for local transportation needs. The scooter of this invention has good operating characteristics and thus can be operated effectively by both adults and children alike. Moreover, the scooter of this invention can be manufactured in a variety of sizes so as to accommodate the needs of children, young people and adults.

Thus, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A scooter comprising:
    a frame which includes a substantially horizontal footboard, an unsteerable rear wheel journaled to a rear end of the footboard; and
    a steerable front wheel journaled to said frame at a forward portion thereof; wherein
    said front wheel has a radius which is larger than said rear wheel, and wherein
    said footboard includes a series of in-line guide rollers journaled to said footboard forwardly of said unsteerable rear wheel.

2. A scooter as in claim 1, wherein said frame includes a forward component which is connected to a forward end of the footboard and is curved upwardly therefrom so as to subtend a circumferential sediment of the larger radius front wheel.

3. A scooter as in claim 2, wherein said forward component of said frame subtends between one-fourth to one-third the circumference of said larger radius front wheel.

4. A scooter as in claim 2, wherein said forward component forms an acute angle at its juncture with said forward end of the footboard.

5. A scooter as in claim 1, wherein said front wheel includes an axle which journals said front wheel to said frame, and wherein said axle establishes a horizontal plane which is vertically spaced above said planar footboard.

6. A scooter as in claim 1 or 5, wherein said front wheel has a radius which is a least four times greater than the radius of said rear wheel.

7. A scooter as in claim 1 or 5, wherein said front wheel has a radius which is a least eight times greater than the radius of said rear wheel.

8. A scooter as in claim 1, wherein said rear wheel includes a plurality of rollers.

9. A scooter as in claim 1, wherein said front wheel is a spoked bicycle wheel and tire assembly.

10. A scooter as in claim 8, wherein said rollers are positioned in in-line relationship.

11. A scooter as in claim 1 or 8, wherein said rear wheel includes a rolling axis which is disposed below said planar footboard.

12. A scooter as in claim 1, wherein said frame includes a forwardmost tubular section which establishes an upright steering axis, and a steerable yoke assembly telescopically received within said tubular section for steering movements about said steering axis, said forward wheel being coupled to said yoke assembly for rolling movement over ground surface and being steerable in response to said steering movements of said yoke.

13. A scooter as in claim 12, wherein said yoke includes an extension rod received telescopically within said tubular section, and wherein said scooter further comprises a handle bar assembly coupled to said extension rod.

14. A scooter as in claim 13, wherein said handle bar assembly is height-adjustable.

15. A scooter as in claim 1, further comprising a brake.

16. A scooter as in claim 15, wherein said brake includes a skid brake depending from a rear end of said footboard.

17. A scooter as in claim 15 or 16, wherein said brake includes a hand-operated caliper brake assembly acting on said front wheel.

18. A scooter as in claim 1, further comprising a kick-stand assembly pivotally coupled to said footboard for movements between a stowed position, wherein said kick-stand is disposed beneath said footboard, and an operative position, wherein said kick-stand extends laterally from said footboard to allow the scooter to stand upright.

19. A scooter comprising:

a frame having an arcuate forward component and a rearward horizontally planar footboard;

an upright steerable yoke assembly journaled to a front end of said arcuate forward frame component for movements about an upright steering axis;

a spoked wheel and tire assembly journaled to said yoke assembly; and a rear wheel assembly connected to a rear end of said footboard, wherein said footboard includes a series of in-line guide rollers journaled to said footboard forwardly of said rear wheel assembly.

20. A scooter as in claim 19, wherein said arcuate forward component is connected to a forward end of the footboard and is curved upwardly therefrom so as to subtend a circumferential segment of said spoked wheel and tire assembly.

21. A scooter as in claim 20, wherein said forward component of said frame subtends between one-fourth to one-third the circumference of said spoked wheel and tire assembly.

22. A scooter as in claim 20, wherein said forward component forms an acute angle at its juncture with said forward end of the footboard.

23. A scooter as in claim 19, wherein said spoked wheel and tire assembly includes an axle which journals said spoked wheel to said yoke, and wherein said axle establishes a horizontal plane which is vertically spaced above said planar footboard.

24. A scooter as in claim 19 or 23, wherein said spoked wheel and tire assembly has a radius which is a least four times greater than the radius of said rear wheel assembly.

25. A scooter as in claim 19 or 23, wherein said spoked wheel and tire assembly has a radius which is a least eight times greater than the radius of said rear wheel assembly.

26. A scooter as in claim 19, wherein said rear wheel assembly includes a plurality of rear wheel rollers.

27. A scooter as in claim 26, wherein said rear wheel rollers are positioned in in-line relationship.

28. A scooter as in claim 19 or 26, wherein said rear wheel assembly includes a rolling axis which is disposed below said planar footboard.

29. A scooter as in claim 19, wherein said frame includes a forwardmost tubular section which establishes said upright steering axis, said steerable yoke assembly being telescopically received within said tubular section for steering movements about said steering axis.

30. A scooter as in claim 29, wherein said yoke includes an extension rod received telescopically within said tubular section, and wherein said scooter further comprises a handle bar assembly coupled to said extension rod.

31. A scooter as in claim 1 or 19, wherein said footboard includes a longitudinally disposed runner element which extends downwardly from said footboard.

32. A scooter as in claim 1 or 19, wherein said guide rollers have sequentially increasing diameters from a forwardmost one thereof to a rearwardmost one thereof.

33. A scooter as in claim 32, wherein said rearwardmost one of said guide rollers has a diameter which is smaller than said rear wheel.

34. A scooter for rolling movement along a conveyance path comprising:

a frame which includes a substantially horizontal footboard;

an unsteerable rear wheel assembly which includes at least two in-line rollers journaled to a rear end of the footboard;

a steerable front wheel journaled to said frame at a forward portion thereof, said front wheel having a radius which is larger than said rollers of said rear wheel assembly; and a kick-stand connected to said footboard and being pivotal between a stowed condition where the kick-stand lies closely adjacent to said footboard, and an operative condition where the kick-stand extends from said footboard to allow the scooter to remain in a substantially upright position, wherein said footboard includes at least one runner element extending in a lengthwise direction from said forward portion of said footboard to said rearward portion, said runner element downwardly projecting from said footboard so as to extend below said kick-stand when in said stowed condition and having a widthwise dimension which is substantially smaller than said footboard so as to establish a relatively low friction bearing surface for contacting a raised obstacle along the scooter's conveyance path in advance of said rear wheel assembly such that the scooter has unimpeded traversal of the raised obstacle as the scooter rolls along the conveyance path.

35. A scooter as in claim 34, wherein said at least one runner element is convexly curved from said forward portion to said rearward portion.

36. A scooter as in claim 34, wherein said footboard includes a sidewall having a re-entrant portion which receives said kick-stand when in said stowed condition thereof.

37. A scooter comprising:

a frame which includes a substantially horizontal footboard;

an unsteerable rear wheel journaled to a rear end of the footboard;

a steerable front wheel journaled to said frame at a forward portion thereof, said front wheel having a radius which is larger than said rear wheel; and a kick-stand connected to said footboard and being pivotal between a stowed condition where the kick-stand lies closely adjacent to said footboard, and an operative condition where the kick-stand extends from said footboard to allow the scooter to remain in a substantially upright position, wherein said footboard includes a bearing surface extending in a lengthwise direction from said forward portion of said footboard to said rearward portion, said bearing surface downwardly projecting from said footboard so as to extend below said kick-stand when in said stowed condition, wherein said bearing surface is defined by a series of in-line guide rollers journaled to said footboard forwardly of said rear wheel.

38. A scooter as in claim 37, wherein said guide rollers have sequentially increasing diameters from a forwardmost one thereof to a rearwardmost one thereof.

39. A scooter as in claim 37 or 38, wherein said rearwardmost one of said guide rollers has a diameter which is smaller than said rear wheel.

40. A scooter comprising:

a frame which includes a substantially horizontal footboard;

an unsteerable rear wheel assembly which includes a pair of in-line rollers journaled to a rear end of the footboard;

a steerable front wheel journaled to said frame at a forward portion thereof, said front wheel having a radius which is larger than said rollers of said rear wheel assembly; and said footboard includes at least one downwardly projecting runner element which is convexly curved in a lengthwise direction forwardly of said rear wheel assembly for contacting raised obstacles in advance of said rear wheel assembly and thereby assisting in unimpeded rolling movement of the scooter along a conveyance path thereof.

41. A scooter as in claim 40, further comprising a kick-stand connected to said footboard and being pivotal between a stowed condition where the kick-stand lies closely adjacent to said footboard, and an operative condition where the kick-stand extends from said footboard to allow the scooter to remain in a substantially upright position.

42. A scooter as in claim 41, wherein said footboard includes a sidewall having a re-entrant portion which receives said kick-stand when in said stowed condition thereof.

43. A scooter comprising:

a frame which includes a substantially horizontal footboard;

an unsteerable rear wheel journaled to a rear end of the footboard;

a steerable front wheel journaled to said frame at a forward portion thereof, said front wheel having a radius which is larger than said rear wheel; and said footboard includes a series of guide rollers extending in a lengthwise direction from said forward portion of said footboard to said rearward portion.

44. A scooter as in claim 43, further comprising a kick-stand connected to said footboard and being pivotal between a stowed condition where the kick-stand lies closely adjacent to said footboard, and an operative condition where the kick-stand extends from said footboard to allow the scooter to remain in a substantially upright position.

45. A scooter as in claim 44, wherein said footboard includes a sidewall having a re-entrant portion which receives said kick-stand when in said stowed condition thereof.

46. A scooter as in claim 43, wherein said guide rollers have sequentially increasing diameters from a forwardmost one thereof to a rearwardmost one thereof.

47. A scooter as in claim 43 or 46, wherein said rearwardmost one of said guide rollers has a diameter which is smaller than said rear wheel.

* * * * *